United States Patent [19]

Kim

[11] 4,364,544
[45] Dec. 21, 1982

[54] VALVE SEAT WITH SEDIMENT GUARD

[75] Inventor: Kee W. Kim, Houston, Tex.

[73] Assignee: Daniel Industries, Inc., Houston, Tex.

[21] Appl. No.: 264,275

[22] Filed: May 18, 1981

[51] Int. Cl.³ .................................................. F16K 3/00
[52] U.S. Cl. .................................. 251/328; 251/170; 251/172; 251/174
[58] Field of Search ................. 251/170, 172, 174, 328

[56] References Cited

U.S. PATENT DOCUMENTS

| | | | |
|---|---|---|---|
| 3,222,762 | 12/1965 | Nowlin | 251/328 X |
| 3,339,886 | 9/1967 | Grove | 251/172 X |
| 3,972,507 | 8/1976 | Grove | 251/172 |
| 4,055,325 | 10/1977 | Vyvial | 251/328 |

Primary Examiner—Harold W. Weakley
Attorney, Agent, or Firm—Gunn, Lee & Jackson

[57] ABSTRACT

Valve seat rings are provided having sediment guard recesses formed in the back face portions thereof, which recesses are in the form of annular grooves having restricted annular openings and defining an internal stop shoulder. A sediment guard is movably positioned within the receptacle and includes an annular sediment blocking portion that protrudes through the restricted groove for sediment blocking engagement with a radial surface defining a portion of the seat recess. The sediment guard also defines a stop portion that is engageable with the stop shoulder to prevent separation of the sediment guard from its receptacle. The sediment guard is urged toward the radial surface of the seat recess by compression springs located within the receptacle.

7 Claims, 3 Drawing Figures

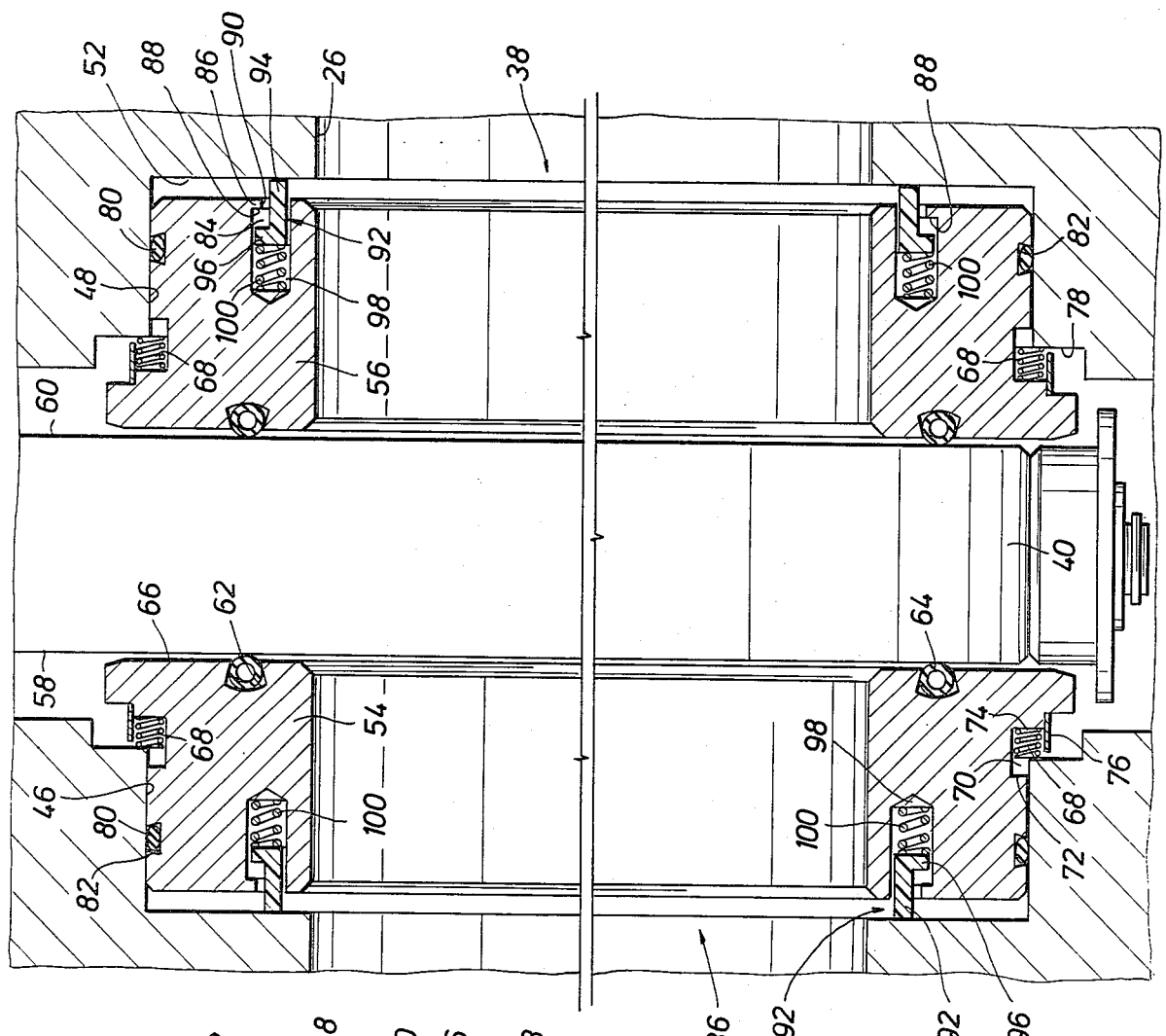
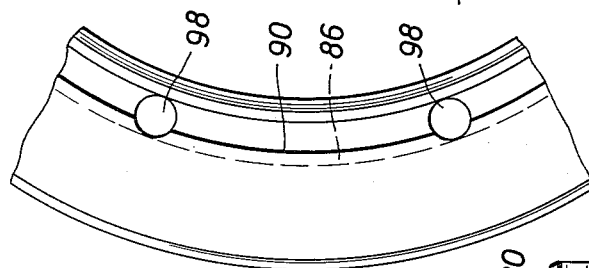
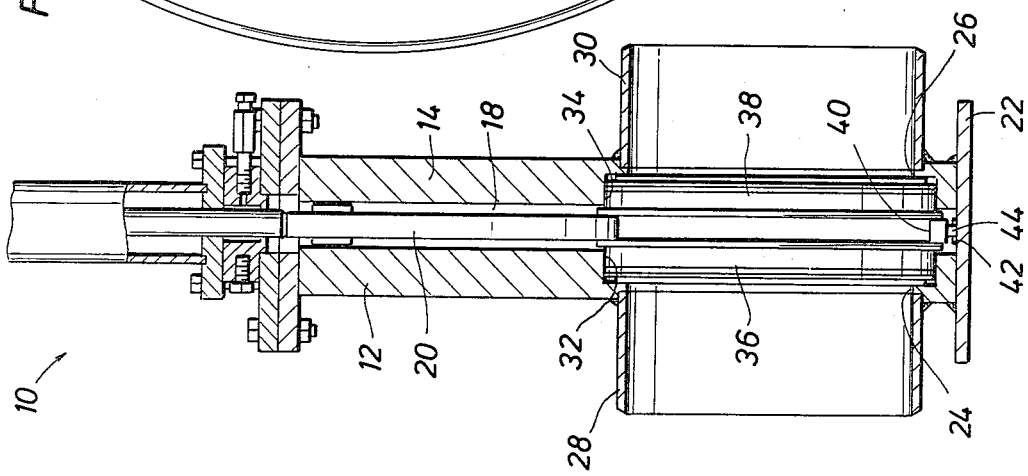

VALVE SEAT WITH SEDIMENT GUARD

FIELD OF THE INVENTION

This invention relates generally to valve mechanisms that are utilized for controlling the flow of fluid through a conduit system. More particularly, the present invention relates to valve mechanism incorporating seat assemblies having sediment guards that allow the valve to remain easy to operate by preventing deposits of sediment from entering the seat recesses of the valve, jamming the seat rings and otherwise interfering with pressure responsive movement and proper positioning of the seat assemblies.

BACKGROUND OF THE INVENTION

It is common practice in the construction of gate valves, ball valves and the like which employ seat rings that are accommodated in seat recesses provided in the valve body and which are spring-urged toward the movable valve member. One difficulty that has been experienced with such valves, particularly when used in systems handling petroleum liquids, is that sediment from the petroleum liquids tends to accumulate behind the seat rings, thereby interfering with the seat movement and seat positioning that is necessary for proper operation of the valve. Most petroleum products are transported and processed in piping systems and such products are frequently of corrosive nature, tending to develop internal pipe scale when the piping system is composed of ferrous metal pipe. Even under circumstances where the petroleum products and other fluids are of noncorrosive nature, ferrous metal pipe, even when new, typically has sufficient internal mill scale, welding slag and weld metal beads to be detrimental to the handling of such fluids because these ferrous materials are readily deposited in valves. Under circumstances where the seat members are of movable nature, logically they must be retained in movable relation within seat recesses and a space must exist between the seat members and rear wall surfaces of the seat recesses in order to accommodate seat movement. These annular seat recess spaces tend to accumulate sediment, especially at the lower portions thereof. Typically, there is insufficient turbulence in the flowing fluid to maintain these recesses clear of sediment deposits.

Deposits of sediment in seat recesses is especially detrimental under circumstances where portions of the gate members are removed from between the seats during opening movement. For example, in gate valves of the short gate type such as disclosed in U.S. Pat No. 3,807,688, deposits of sediment can settle in the seat pockets and jam the seats, thus restricting seat movement to the extent that it becomes difficult or impossible to move the gate member fully between the seats. In this condition, sufficient forces can be developed between the gate member and seats during closing movement to cause metal galling or other seat damage, thereby resulting in the necessity for repairing the valve to again render it usable.

THE PRIOR ART

Many different attempts have been made in the past to provide valve assemblies having sediment guards to prevent unnecessary accumulation of sediment in the seat recesses and the consequent problems that are caused by sediment interference with seat movement. Examples of gate valve mechanisms having seat assemblies provided with sediment guards are illustrated by U.S. Pat. Nos. 3,121,553 and 3,972,505 of Grove. In some cases, gate valve mechanisms have been provided with seat assemblies having fixed sediment guard elements as indicated by U.S. Pat. Nos. 3,353,784, 3,269,695 and 3,339,886, all of Grove. Obviously, in the case of fixed sediment guards that are usable in conjunction with valves having movable seat assemblies, it is difficult to prevent sediment materials from entering into the seat recesses. At best, sediment guards of this nature simply retard deposits of sediment in the seat recesses, thereby allowing the valve mechanisms to remain in service for longer periods of time without becoming disabled due to sediment interference. In cases where sediment guards are of flexible nature and thus maintain contact with the seat assemblies and seat pocket walls by virtue of expansion and contraction movement, such sediment guards typically have adverse reaction with petroleum products and soon become of little value is retarding deposits of sediment. It is desirable, therefore, to provide a valve mechanism having seat assemblies provided with sediment guards and wherein the sediment guards will provide efficient blocking of sediment deposits within seat recesses and also remain servicable for extended periods of time.

SUMMARY OF THE INVENTION

It is, therefore, a primary feature of the present invention to provide a novel sediment guard mechanism for movable valve seat assemblies, wherein a sediment guard is provided which maintains sediment blocking engagement with respect to the seat recess during all phases of seat movement.

It is a further feature of this invention to provide a novel sediment guard mechanism for movable valve seat assemblies wherein a sediment guard is provided which is mechanically interlocked with respect to its seat ring and is, therefore, restrained from inadvertent displacement from the seat ring.

Another feature of the invention is to provide a sediment guard for valves of the type referred to above which is simple to construct and assemble and which remains effective for extended periods without undue servicing.

Briefly, the present invention concerns the provision of movable seat assemblies for valves, especially gate valves wherein seat rings are movably positioned within seat recesses formed about inlet and outlet flow passages and are maintained in sealing engagement with a valve member than is movable between open and closed positions to control the flow of fluid through flow passages of the valve. The valve is typically provided with a single seat member of a pair of seat members. Each seat member is formed at the back face portion thereof to define a circular groove within which a circular sediment guard is movably positioned. The circular groove is restricted at its outer portion so as to define an annular restricted groove through which a sediment blocking portion of the sediment guard is extended. An annular stop shoulder is also defined within the circular groove and is positioned for engagement by an annular stop portion formed on the sediment guard to thereby restrict movement of the sediment guard relative to the seat member and thus prevent the sediment guard from being displaced from the seat member. Urging means, such as a plurality of compression springs, is positioned within the annular groove and bear against the inner portion of the sediment guard, thereby urging it outwardly to maintain the sediment blocking portion thereof in engagement with a radial surface defined by the seat recess.

The sediment guard may be provided in the form of a ring-like structure that is composed of material having sufficient resiliency to enable it to be forced through the restricted groove into the enlarged portion of the sediment guard groove and sufficient elastic memory so as to return to its original configuration after being forced through the restricted portion of the groove. The sediment guard may be defined by an unbroken ring of any one of a number of suitable plastic materials or, in the alternative, may be provided in the form of an elongated extrusion that may be inserted into the sediment guard groove in the manner discussed above. In the alternative, the seat ring may be formed to define a sediment guard insert opening intersecting the circular groove, thereby allowing an elongated length of sediment guard material to be inserted endwise through the opening into properly positioned realtionship within the sediment guard groove.

Other and further objects, advantages and features of the present invention will become apparent to one skilled in the art upon consideration of this entire disclosure. The form of the invention, which will now be described in detail, illustrates the general principals of the invention but, it is to be understood that this detailed description is not to be taken as limiting the scope of the present invention.

BRIEF DESCRIPTION OF THE DRAWINGS

So that the manner in which the above recited features, advantages and objects of this invention are attained and can be understood in detail, more particular description of the invention, briefly summarized above, may be had by reference to the embodiment thereof which is illustrated in the appended drawings, which drawings from a part of this specification.

It is to be noted, however, that the appended drawings illustrate only a typical embodiment of the invention and are, therefore, not to be considered limiting of its scope, for the invention may admit to other equally effective embodiments.

IN THE DRAWINGS

FIG. 1 is a sectional view of a gate valve having seat assemblies therein that are constructed in accordance with the present invention;

FIG. 2 is a fragmentary sectional view of the gate valve mechanism of FIG. 1 and illustrating the seat and sediment guard assemblies thereof in greater detail; and FIG. 3 is a fragmentary end view of the seat ring of FIG. 2 with the sediment guard and springs removed and illustrating the relationship of the blind bores to the sediment guard groove.

DETAILED DESCRIPTION OF PREFERRED EMBODIMENT

Referring now to the drawings and first to FIG. 1, a gate valve mechanism is shown generally at 10 which is of the fabricated, short gate type and which incorporates seat and sediment guard mechanisms that are constructed in accordance with the present invention. Although the gate valve 10 is shown to be of fabricated construction and incorporates a short, non-ported gate, it is not in any way intended to limit the present invention to the particular valve construction shown in FIG. 1. Valve seat and sediment guard assemblies, according to this invention, may be utilized in conjunction with valves of other than the fabricated type having both ported and non-ported gates. The prevent invention is also practical in conjunction with other types of valves such as ball valves, for example, without departing from the spirit and scope of this invention. As shown in FIG. 1, the gate valve 10 incorporates a pair of flat end walls 12 and 14 having a pair of flat side walls interconnected therewith such as by welding and forming a rectangular fabricated body structure. The end walls 12 and 14 cooperate with the side walls to define a generally rectangular valve chamber 18 within which is movably positioned a gate member 20 that is movable between an open or retracted position as shown and a closed or blocking position where the gate member prevents flow of fluid through the valve. The gate member 20 is shown to be of the short, non-ported type and, in the open position thereof, as shown in FIG. 1, only the lower portion of the gate member is positioned between the seat members of the valve mechanism. A bottom wall structure 22 also cooperates with the side walls and end walls to form a lower closure for the valve chamber 18.

The end walls 12 and 14 of the valve body structure are formed to define flow passage openings 24 and 26 and a pair of pipe sections 28 and 30 are welded to the end walls 12 and 14 about the flow passage openings, thus forming inlet and outlet flow passages for the valve mechanism.

Each of the end wall members 12 and 14 is defined internally to form annular set recesses 32 and 34 within which is received a pair of seat and sediment guard assemblies 36 and 38, each being of generally identical configuration. The seat recesses and sediment guard assemblies of this invention are disclosed in greater detail in conjunction with FIG. 2. As further illustrated in FIG. 1, the lower portions of the seat assemblies may be retained in spaced relation by means of one or more spreader elements such as shown at 40 and further shown and described in U.S. Pat. No. 3,972,507 of Grove. With the gate member 20 maintaining minimum spacing of the seat and sediment guard assemblies at the upper portion thereof and with the spacer means 40 maintaining minimum spacing of the lower portion thereof, the seat and sediment guard assemblies will remain in substantially parallel and properly spaced relation even in the open position of the valve. Obviously, in the case of ported gate valves, the gate member is always positioned between the seat assemblies and there is no tendency for the seat assemblies to shift toward one another to the extent that the gate member cannot be readily inserted between them. Deposits of sediment can interfere with movement of the seats of gate valves having ported type gates.

The spreader means utilized in the valve incorporates a mounting plate 42 which is dimensioned to interfit the bottom of the valve body and can be secured in place by any suitable means such as by tack welding. Upright standards 44 are secured to the end portions of the mounting plate such as by welding and serve to support the spreader members 40. Typically, two spreader members 40 are employed, one being positioned on each side of the valve body and each being supported from respective upright standards by a leaf spring structure that enables the spreader members to be moved from between the seat assemblies in the event it is desired to remove the seat assemblies from seat recesses of the valve body structure. The structure and function of the spreader members is more particularly described in U.S. Pat. No. 3,972,507. The diameter of each spreader member is slightly less than the thickness of the gate. Each spreader member is carried loosely by the free end of its leaf spring and the spring normally accomplishes positioning of each of the spreaders between the seat assemblies at a location radially outwardly of the seal member of the seat assemblies.

The valve mechanism is provided with means for imparting reciprocal opening and closing movement to the gate member 20 within the valve chamber 18 and, such means may take any suitable form as desired. Moreover, the valve mechanism incorporates a valve stem and valve stem sealing means which may conveniently take the form illustrated and described in U.S. Pat. No. 3,972,507.

For a more detailed understanding of the seat and sediment gurd assemblies and the relationship thereof with other parts of the valve mechanism, reference may be had to FIG. 2. The seat recesses 32 and 34 are defined respectively by cooperating cylindrical surfaces 46 and 48 and radial surfaces 50 and 52. The cylindrical surfaces 46 and 48 of each of the seat recesses is generated about the center-line of the respective flow passage opening 24 and 26, thereby being concentric with the flow passage of the valve. The radial surfaces 50 and 52 are circular, generally planar surfaces that are oriented in substantially normal relation with the center-line of the flow passages. These particular structural relationships, however, are not intended to be limiting as regards the present invention, it being clear that the present invention may be utilized effectively under circumstances where the seat recesses are of other configuration.

Each of the seat assemblies 36 and 38 includes generally circular seat rings 54 and 56 which may, if desired, be of substantially identical configuration. For this reason, the structure of only one of the seat and sediment guard assemblies is described in conjunction with the drawings.

The gate member 20 is formed to define parallel sealing surfaces 58 and 60 which are also frequently referred to as "working surfaces". The seat members are formed to define annular seal grooves 62 within which is located face sealing assemblies 64 of annular configuration. The face sealing assemblies protrude from the grooves 62 slightly beyond an annular planar face sealing surface 66 that is normally positioned in close proximity with the respective sealing surface of the gate. Under circumstances where the valve mechanism is subjected to high pressure conditions, the annular sealing member 64 will typically be completely displaced within its groove and the planar face sealing surface 66 of the seat ring will move into metal-to-metal sealing relationship with the respective sealing surface of the gate member. The seal rings or sealing assemblies 64 may be of any suitable form, such as the form illustrated in U.S. Pat. No. 3,746,303.

The seat ring is yieldably urged toward the gate by spring means, preferably in the form of a plurality of coil springs 68 which are circumferentially spaced and disposed about the outer periphery of the seat ring. The seat ring is provided with an annular recess 70 to accommodate the springs 68 and which provides a retaining shoulder 72 and a thrust shoulder 74. A metal band 76 is shown generally surrounding the recess 70 and springs 68. This band may be attached to the seat rings by suitable means, such as spot welding. The proportion of the springs 68 and of the recess 70 is such that one end of each spring 68 seats upon the shoulder 74 while the opposite end normally bears against a thrust shoulder 78 defined about the respective seat recess. When a seat ring is removed from its corresponding body recess, the springs expand in length whereby they engage the respective shoulder 72 without being completely relaxed, thus providing sufficient frictional retention to prevent them from being dislodged from the recess 70 and the seat ring. During assembly of the springs with the seat rings, the springs are partially compressed and inserted within the recess 70 with their ends engaging the shoulders 72 and 74, thus retaining the springs as part of the seat ring assembly. Reference may also be had to U.S. Pat. No. 3,339,886 within which this type of spring retention is disclosed and claimed. The seat and sediment guard assemblies are, therefore, energized mechanically by means of the compression springs, thereby urging the annular face sealing elements 64 thereof into sealing engagement with the respective sealing surfaces 58 and 60 of the gate member 20.

It is desirable to establish sealing between the seat assemblies and valve body structure. It may also be desirable to provide the seat assemblies with the capability of being pressure energized such that the force of sealing engagement thereof with the sealing surfaces of the gate member is somewhat proportional to the pressure of the fluid being controlled by the valve. As shown in FIG. 2, pressure energized seat and sediment guard assemblies are provided by means of annular sealing elements 80 that are retained within respective seal grooves 82 formed in an outer peripheral portion of the respective seat rings. Sealing members 80 establish sealing engagement with the respective cylindrical surface 46 of the seat recess and define a pressure exposed seat area at the rear portions of the seat rings that is greater than the pressure exposed seat area defined by sealing elements 64. There is, thus, defined a differential seat area that is of larger at the rear portion of the seat rings and thus a differential force is established by pressure acting upon the seat rings which urges the seat rings toward the gate member 20. As the pressure of the fluid within the valve increases, logically this resultant force will also increase and the sealing ability of the valve will be pressure responsive.

It is desirable to prevent entry of sediment such as sand, line scale, welding slag, weld metal beads etc. from entering into the seat recesses behind the seat rings and becoming deposited therein to the extent that movement of the seat assemblies is retarded. It is also desirable that the sealing and area differentiating capability of the outer sealing element 80 remain effective even though the valve seat mechanism is provided with such sediment guard means. It is also desirable to insure that the valve mechanism does not become jammed even when a substantial volume of sediment is encountered and that the valve mechanism remains freely operable at all times. In accordance with the present invention, the valve seat assemblies are provided with a sediment guard capability which does not establish fluid tight sealing between the seat assemblies and seat recess walls and which, therefore, allows the outer sealing element 80 to remain effective. In accordance with the present invention, seat assemblies having a sediment guard capability may conveniently take the form illustrated in FIGS. 2 and 3. Each of the seat rings is formed at the rear face portion thereof to define an annular sediment guard groove or recess 84 that is located near the inner peripheral portion of the seat ring. The seat ring structure is also formed to define an annular stop flange portion 86 that defines an internal annular stop shoulder 88 and also forms a restricted annular opening or groove 90. A sediment guard element, illustrated generally at 92, is positioned within the annular groove 84. The sediment guard 92 defines an outer rim or body portion 94 that projects through the annular opening or groove 90 and is maintained in sediment blocking contact with the respective radial surface of the seat recess. The sediment guard also includes an inwardly extending annular stop flange portion 96 that is engagable with the stop shoulder 88 such that outward movement of the sediment guard is restrained by the stop shoulder of the seat ring.

Since the seat assemblies are movable within the seat recesses, the sediment guard mechanism must accommodate such movement while, at the same time, retaining sediment blocking capability. In accordance with this invention, the sediment guard is, therefore, movably positioned within the sediment guard recess and is continuously urged into operative sediment blocking relationship with the radial wall surface 52 by spring means. As shown in FIG. 3, a plurality of spaced blind bores 98 are drilled from the rear face portion of the seat ring and, thus, provide recesses for a plurality of helical compression springs 100 that are retained within respective ones of the blind bores 98. These compression springs bear against the flange portion 96 of the sediment guard and, thereby, urge it toward the radial surface 52. Although compression springs may be utilized in the manner shown in FIG. 2 for urging the sediment guard to its operative position, it is not intended to limit this invention to the use of such compression springs. It is within the scope of this invention to utilize other force inducing means such as a wave spring or any other suitable resilient urging element.

The sediment guard may be formed of any suitable material having a sufficient degree of flexibility that it can be forced through the restricted annular opening or groove 90 by being physical deformed. After this insertion activity has taken place, the sediment guard will then return to its original condition since its deformation will not have exceeded the elastic limits or memory of the material from which the sediment guard is composed. The sediment guard may, therefore, be formed of any one of a number of suitable plastic or elastomeric materials that are capable for use for the purpose intended. It should be borne in mind that the surface engaging portion of the rim 94 does not establish sealing engagement capable of preventing application of line pressure to the other sealing element 80.

The sediment guard may be formed in the configuration of an endless ring of material which is forced through the opening or groove 90 into the annular groove 84. In the alternative, however, the sediment guard may be in the form of an elongated strip of material such as may be manufactured by extrusion or any other suitable process and which may be inserted into the sediment guard groove 84 in the same manner as described above or may be inserted end-wise into the groove through an appropriate guard insert opening. For example, the drilled blind bores 98 define openings through the annular stop flange 86. It is possible to insert a strip of sediment guard material end-wise through one of the blind bore openings 98 without undue deformation of the material from which the sediment guard is composed. This feature allows the sediment guard to be composed of a material having greater structural integrity and yet capable of being inserted into operative position within the sediment guard groove. In this case, the end portions of the sediment guard strip are brought into close proximity and, if desired, cemented in assembly to form an unbroken ring. If broken, however, the small space that exists between the ends of the strip will be located at the top position and will be insufficient to permit entry of any significant quantity of sediment into the seat recess. Where the sediment guards are in the form of one-piece rings, holes are drilled at the upper portion of the seat ring to insure that the sediment guard does not form a seal with the back face of the seal pocket. This fracture also insures that the seal ring 80 always responds to line pressure and the seat is always pressure responsive due to pressure induced force differential.

In view of the foregoing, it is readily apparent that the present invention provides seat assemblies with the capability of preventing deposits of sediment from entering seat pockets and interfering with the operational capability thereof. The sediment guard mechanism is of simple nature and, thus, is adpated for low cost manufacture and installation. Moreover, the sediment guard mechanism allows seat assemblies to remain effectively operative for much greater periods of time than if the sediment guard were not utilized. The sediment guard is capable of being completely positioned within the groove 84 in the event the back face surface of the seat ring comes into contact with the radial surface 52 of the seat recess. It is, therefore, apparent that the present invention is capable of providing all of the features and advantages discussed hereinabove, together with other features and advantages that are inherent to this invention. It is intended that the foregoing discussion represent only a preferred embodiment of this invention and that is not be considered in any way limiting of the spirit and scope hereof.

While the foregoing is directed to the preferred embodiment of the present invention, other and further embodiments of the invention may be devised without departing from the basic concept thereof, and the scope thereof is determined by the claims which follow.

I claim:

1. A valve mechanism for controlling the flow of fluid, said valve mechanism comprising:
   (a) a valve body structure defining a valve chamber and inlet and outlet flow passages intersecting said valve chamber, said valve body further defining annular seat recess means about said flow passages, said seat recess means defining radial surface means;
   (b) a gate member being movably positioned within said valve chamber and being movable between open and closed positions to control the flow of fluid through said flow passages;
   (c) means for imparting controlling movement to said gate member;
   (d) annular seat means being movably retained within said seat recess means and having a sealing portion establishing sealing engagement with said gate member and a rear face portion opposing said radial surface means, said rear face portion being formed to define receptacle means;
   (e) sediment guard means being movably positioned within said receptacle means; and (f) urging means continuously maintaining said sediment guard means in contact with said radial surface means.

2. A valve mechanism as recited in claim 1, wherein:
(a) said receptacle means is formed by a generally circular groove;
(b) said sediment guard means being of generally circular form and defining a circular sealing portion, said circular sealing portion extending from said circular groove and establishing sediment blocking engagement with said radial surface means; and
(c) said urging means being spring means.

3. A valve mechanism as recited in claim 2, wherein:
(a) a plurality of blind bores are formed within said rear face portion of said seat means in intersecting relation with said circular groove; and
(b) said spring means being a plurality of compression springs retained respectively within said blind bores and bearing against said sediment guard means.

4. A valve mechanism as recited in claim 2, wherein:
(a) said circular groove is formed to define an annular restriction at the outer portion thereof forming an annular groove of restricted dimension as compared to the inner portion of said groove and forming stop shoulder means; and
(b) said sediment guard means defining stop means being engagable with said stop shoulder means to limit outward movement of said circular sealing portion and retard said sediment guard means against separation from said circular groove.

5. A valve mechanism as recited in claim 4, wherein: said sediment guard means is formed of material having sufficient resiliency to permit forcing of said sediment guard means through said restricted annular groove and sufficient elastic memory to return to the initial configuration thereof after being forced through said restricted groove.

6. A valve mechanism as recited in claim 5, wherein: said sediment guard means is in the form of an unbroken ring.

7. A valve mechanism as recited in claim 5, wherein:
(a) said receptacle means defining an insertion opening intersecting said circular groove; and
(b) said sediment guard means being in the form of an elongated strip of material of sufficient length to form a circle of corresponding dimension with the dimension of said circular groove, said sediment guard means being inserted end-wise through said insertion opening and into said circular groove.

* * * * *